United States Patent [19]

Owings

[11] Patent Number: 5,156,482
[45] Date of Patent: Oct. 20, 1992

[54] LOCKABLE TURNBUCKLE

[76] Inventor: Samuel S. Owings, One Kelly Ct., Annapolis, Md. 21403

[21] Appl. No.: 703,659

[22] Filed: May 21, 1991

[51] Int. Cl.⁵ .......................... F16B 7/06; F16G 11/12
[52] U.S. Cl. ........................................ 403/43; 403/46;
403/315; 411/340; 411/345
[58] Field of Search ...................... 403/43, 46, 315, 44,
403/45, 47, 48; 411/340, 345

[56]  References Cited

U.S. PATENT DOCUMENTS

| | | | |
|---|---|---|---|
| 1,286,701 | 12/1918 | Mathias | 403/46 |
| 2,479,172 | 8/1949 | Landon | 403/46 |
| 2,790,658 | 4/1957 | Robinson | 403/44 |
| 3,851,978 | 12/1974 | Kuipers | 403/46 X |

FOREIGN PATENT DOCUMENTS

| | | | |
|---|---|---|---|
| 832965 | 3/1952 | Fed. Rep. of Germany | 403/45 |
| 436613 | 4/1912 | France | 411/345 |
| 116338 | 4/1946 | Sweden | 403/43 |

Primary Examiner—Randolph A. Reese
Assistant Examiner—Heather Chun
Attorney, Agent, or Firm—Sughrue, Mion, Zinn, Macpeak & Seas

[57] ABSTRACT

Axial slots are provided within threaded ends of connection rods which are oppositely threaded into axially aligned tapped bores within longitudinally spaced end walls of an elongated hollow frame turnbuckle body. Elongated lock plates are pivotally mounted, respectively, at one end thereof to the connecting rod, within the axial slots. The lock plates have limited rotation between a first axially aligned position with the axis of the connection rods and a second position at some angle thereto. In the second position the end of the lock plates project radially outwardly of the connection rod slots into contact with a side wall of the elongated hollow turnbuckle body to prevent rotation of the turnbuckle body relative to the connection rods.

7 Claims, 1 Drawing Sheet

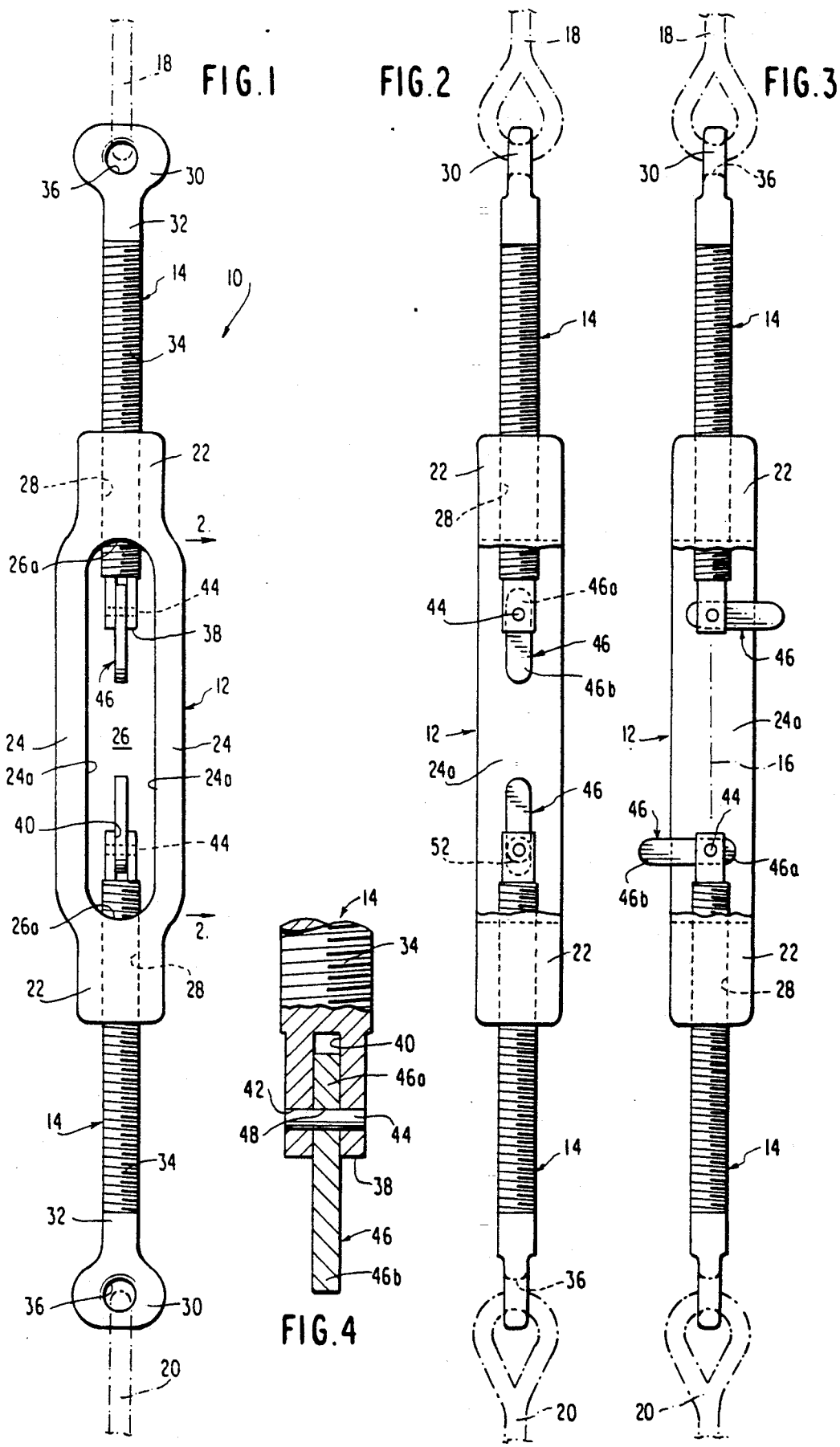

LOCKABLE TURNBUCKLE

FIELD OF THE INVENTION

This invention relates to turnbuckles and more particularly to a simplified lock plate incorporated in the turnbuckle which is readily settable in either a locking or nonlocking position.

BACKGROUND OF THE INVENTION

Turnbuckles in use, are often subjected to vibration or other forces tending to gradually loosen the turnbuckle. Particularly in marine installations such as sailboats, turnbuckles are employed for tensioning stays coupled at one end to the sailboat deck, and at an opposite end to the sailboat mast. When such sailboats are subjected to high wind conditions, the turnbuckles rapidly loosen.

To combat such problems, turnbuckles in the past have been provided with jam nuts. The jam nuts are tightened against the body of the turnbuckle. Opposite handed threaded shanks are threaded within aligned tapped holes within opposite ends of the turnbuckle body. By rotation of the jam nuts, into frictional contact with the turnbuckle body end walls, the threaded shanks are maintained in an axially set position. However, the tightening of such jam nuts involves an expenditure of extra time and effort in setting the turnbuckle and is generally inconvenient to the user.

Various alternative means have been employed for locking the turnbuckle with the threaded shanks in a proper position and with the stays or other tensioned members set at a predetermined, proper tension. Such locking or latching arrangements for turnbuckles are exemplified by U.S. Pat. No. 2,278,320 to H. K. Kath entitled "Locking Turnbuckle" and issued Mar. 31, 1942; U.S. Pat. No. 2,479,172 to R. W. Landon issued Aug. 16, 1949 and entitled "Turnbarrel Connection"; U.S. Pat. No. 2,512,501 to A. W. Miller issued Jun. 20, 1950 entitled "Turnbuckles"; U.S. Pat. No. 3,806,265 to Mark Hattan issued Apr. 23, 1974 entitled "Self-Locking Turnbuckle"; U.S. Pat. No. 3,851,978 to Sytze Kuipers issued Dec. 3, 1974 and entitled "Turnbuckle"; and U.S. Pat. No. 4,297,046 to Roy F. McGill issued Oct. 27, 1981 and entitled "Turnbuckle".

Such latching or locking turnbuckles are fairly complex, require elements in addition to the basic turnbuckle body and axially rotatable opposite hand threaded elements coaxially mounted to tapped bores within the end walls of the turnbuckle body while tending to interfere with the normal rotation of the threaded elements to increase or decrease the tension within the system bearing the turnbuckle.

Conventionally cotter pins are positioned within radial holes within the threaded rod ends borne by the tapped holes of the open rectangular frame turnbuckle body, after the turnbuckle is tightened to the desired degree of tension for the system connected by the turnbuckle. The cotter pins have free extending radially outwardly of radial hole within the rod end beyond the outer surface of the threaded rod ends, and contact with a side wall of the open, rectangular frame body prevent rotation of the rod ends within the body.

However, where cotter pins are employed as the locking means for the turnbuckle threaded rod ends, each time the tension of the stayed system requires change, the split free ends of the cotter pin must be pinched together, the cotter pin removed, adjustment made by relative rotation of the threaded rod ends and the rectangular turnbuckle frame body and then replacement of the cotter pin and re-flaying of the split ends (if possible) or replacement by a new cotter pin. Again, such action requires time, tools, and manual dexterity. Where the sailboat or yacht takes the form of a racing yacht, retuning of the rig (mast supporting structure) may occur before each race or after a given series of races.

It is therefore, a primary object of the present invention to eliminate cotter pins as a locking means for turnbuckles, particularly for turnbuckles for use in tensioning a sailboat mast stay system and which employs a simplified lock system into threaded rod ends, in the form of a rotatable lock plate which rotates from an in-line position with the axis of the threaded rod ends, to one at some angle thereto, which is frictionally restrained in both the latched and unlatched positions and which may be shifted between the latched and unlatched position by a simple tool such as a screwdriver, and which does not impede change in tensioning of the system to which the turnbuckle is coupled during relative rotation of the open, rectangular frame body with respect to the threaded rod ends carrying the pivotable lock plates.

BRIEF DESCRIPTION OF THE DRAWINGS

FIG. 1 is a side elevational view of a lockable turnbuckle forming a preferred embodiment of the invention with pivotable lock plates carried by the threaded rod ends in unlocked position.

FIG. 2 is an end view of the turnbuckle of FIG. 1, partially in sections about II-2 of FIG. 1.

FIG. 3 is a similar view to that of FIG. 2 with the rotatable lock plates pivoted 90 to lock position.

FIG. 4 is a partial sectional view, to an enlarged scale of a threaded rod end of the turnbuckle of FIG. 1.

DESCRIPTION OF THE PREFERRED EMBODIMENTS

Referring to the drawings, the lockable turnbuckle of the present invention in a preferred form is indicated generally at 10 and consists of three major parts, an elongated, open frame, generally rectangular turnbuckle body, indicated generally at 12, and eyebolts 14 threadably mounted at opposite ends of the body 12. By relative rotation of the open frame body 12 and eyebolts 14, about the longitudinal axis 16 of the assembly, the threaded rod ends of the eyebolts move axially towards and away from each other. Turnbuckle 10 connect two elements or parts such as mast supporting eyed stay ends 18 and 20 of a mast supporting stay leading, for instance, from a sailboat deck (not shown) to an upper part of the yacht or sailboat mast (not shown) fixed to the deck and rising vertically upwardly therefrom.

The turntable body 12 which may be of cast or formed metal, has a plan configuration as per FIG. 1 of a elongated, open, modified rectangular configuration including a longitudinally opposed end walls 22, and laterally opposed side walls 24. The side walls being of generally rectangular cross-section and are flared outwardly from the end walls 22, forming an internal cavity 26 having oppositely facing concave ends 26a. The end walls 22 are provided with axially aligned tapped bores 28. The tapped bores are threaded with opposite hand threads. The eyebolts 14 include generally circular enlarged, heads 30, integral with shanks 32, which project axially from the head and terminate in threaded rod ends 34. Heads 30 are provided with a circular holes 36 through which the eye stay ends of the stay elements 18 and 20 pass, such that, by rotation of the open frame body turnbuckle body 12 and due to the opposite hand threading of the threaded rod ends 34 and the tapped bores 28 within a respective end wall 22 of the open frame body 12, the eyebolts tend to move axially towards and away from each other. In having their threaded rod ends 34 moving axially towards each other within cavity 26, the tension of the stay system exemplified by the eyed ends 18, 20 is varied. Relative rotation of the body 12 about axis 16 in the opposite direction reduces tension on the stay system. Such aspects of the turnbuckle 10 as described to this point are conventional.

The present invention is directed to a turnbuckle 10, with an improved, low cost, highly effective locking arrangement for locking the threaded rod ends at desired axial positions relative to the elongated open frame body 12 once proper tension has been set up in the system utilizing the turnbuckle 10. In that respect, the threaded rod ends 34 remote from the eyes 30 of the eyebolts 14 are each provided with a narrow width, elongated slot 40, from the axial end face 38 inwardly, in the direction of the eye head 30 of the eyebolt. Further, a small diameter radial hole 42 is drilled or otherwise formed within the threaded rod end, axially inwardly of the end face 38, through the center line of the threaded rod end and at right angles to the plane of the elongated slot 40. Within radial hole 42 is fixedly positioned a metal pivot pin 44. A narrow, generally rectangular metal lock plate 46 is pivotally connected at one end 46a to each threaded rod end 34. Lock plate 46 is inserted within the slot 40 and the pivot pin 44 inserted within the radial hole 42 and passed through a similar small diameter hole 48 within inboard end 46a of lock plate 46. As a result, the lock plate 46 is eccentrically pivotally mounted within slot 40 and permitted to rotate between an axial aligned position as shown in FIGS. 1 and 2 to a 90° right angle position thereto as evidenced in FIG. 3. The lock plate 46 has a given overall length from its pivot pin end 46a to outboard end 46b remote from the pivot connection. Upon rotation 90° from an aligned slot 40, to a position at right angles thereto end 46b of the lock plate will rotate into abutment with an inside face 24a of elongated, open frame body side wall 24 thereby preventing further relative rotation of the threaded rod end 34 of shank 32 beyond the position of contact between the lock plate and the elongated open frame body side wall 24.

Preferably, there is provided, a friction fit between the rotatable lock plate 46 and the threaded rod end. In the illustrated embodiment, the lateral width of slot 40 within the threaded rod end 34 of the eyebolt 14 is slightly less than or equal to the thickness of the lock plates 46, such that there is frictional contact between the inserted end 46a of the lock plate and the laterally opposed slot surfaces of the threaded rod end defined by slot 40.

Alternatively, a thin elastomeric washer 52, FIG. 2 formed of rubber or the like may be inserted between the lock plate 46, at end 46a and the facing surface of the threaded rod end slot 40, such that rotation of the lock plate about the axis of the pivot pin 44 is under frictional restraint. The lock plate is thus retained in both of its two extreme positions after rotation thereto, i.e., a first, unlocked position shown in FIGS. 1 and 2 where the longitudinal axis of the lock plate 46 is aligned with the longitudinal axis of the turnbuckle as at 16 and a second right angle, locked position illustrated in FIG. 3.

The frictional restraint of the lock plates 46 in longitudinally aligned positions with the axis of the threaded rod ends or positions at right angles thereto ensures the maintenance of the turnbuckle as per FIGS. 1 and 2, or per FIG. 3 once effected by hand, or by manual tool manipulation such as through the use of a screwdriver. The lock plates may be readily flipped between positions resisted by the frictional restraint. The frictional restraint force is exerted continuously.

While certain specific embodiments of the present invention has been disclosed, the invention is of course not limited to any particular form. But rather, is applicable broadly to all such variations as fall within the scope of the dependent claims.

I claim:

1. A lockable turnbuckle comprising: an elongated, hollow frame body having longitudinally opposed end walls and unitary, laterally opposed side walls; tapped, opposite hand threaded, axially aligned bores within respective end walls of said body; threaded connection rods sized to and threadably positioned within respective bores including a first headed end exterior of the body and a section threaded rod end interiorly of the body such that relative rotation of said body and said connection rods causes the threaded ends of the connection rods to move coaxially towards and away from each other; a narrow slot provided axially within a threaded rod end of at least one of said connecting rods; an elongated lock plate pivotally mounted at one end thereof to said connecting rod within said axial slot, for limited rotation between a first position axially aligned with the axis of the connecting rod to a second position at some angle thereto; and being of a length such that the other end of said lock plate remote from said pivot axis projects laterally outward of said threaded rod end slot into contact with a side wall of said body for preventing relative rotation therebetween.

2. The turnbuckle as claimed in claim 1, further comprising means for a frictionally restraining pivoting of said lock plate within said slot.

3. The turnbuckle as claimed in claim 2 wherein, said one end of said lock plate is of a width approximately equal to the width of said slot carrying the same such that frictional contact exists between the opposite faces of the lock plate and the opposed surfaces of the threaded connection rod end defining said slot.

4. The turnbuckle as claimed in claim 2 wherein, an elastomeric washer is positioned within said slot intermediate of the inserted end of the lock plate and the facing surface of the threaded rod end slot.

5. The turnbuckle as claimed in claim 1 wherein, the height of said elongated lock plate is generally equal to the height of the slot within the threaded rod end pivotally mounting said lock plate.

6. The turnbuckle as claimed in claim 1 wherein, the length of said lock plate is in excess of the threaded rod end slot receiving the same.

7. The turnbuckle as claimed in claim 1 wherein, each connection rod includes an axial slot within the threaded rod end thereof, said turnbuckle includes two lock plates and said lock plates are pivotally mounted, respectively, within the slots of said threaded rod ends.

* * * * *